United States Patent [19]

Yeomans

[11] Patent Number: 4,976,566
[45] Date of Patent: Dec. 11, 1990

[54] TOOL MOUNTING ASSEMBLY

[76] Inventor: Allan J. Yeomans, c/o Yeomans Plow Co., 70-82 Close Street, Parkes, P.O. Box 224, Parkes, N.S.W. 2870, Australia

[21] Appl. No.: 400,375

[22] Filed: Aug. 30, 1989

[51] Int. Cl.$^5$ .................... F16B 2/14; A01B 15/00
[52] U.S. Cl. .................... 403/374; 403/409.1; 172/751; 172/762
[58] Field of Search ............ 172/762, 753, 751, 749, 172/744, 374; 403/409.1, 367, 381, 354

[56] References Cited

U.S. PATENT DOCUMENTS

| | | | |
|---|---|---|---|
| 775,770 | 11/1904 | Herrod, Jr. | 172/751 X |
| 1,339,357 | 5/1920 | Kopriva | 403/374 X |
| 2,757,595 | 8/1956 | Clifford et al. | 172/762 |
| 2,765,136 | 10/1956 | Knapp | 403/374 X |
| 4,190,115 | 2/1980 | Couture | 172/762 X |
| 4,320,608 | 3/1982 | Deike | 403/409.1 X |
| 4,576,239 | 3/1986 | Launder | 172/751 |
| 4,840,513 | 6/1989 | Hackett | 403/49 |

Primary Examiner—Peter M. Cuomo
Attorney, Agent, or Firm—Wood, Phillips, Mason, Recktenwald & VanSanten

[57] ABSTRACT

An assembly for mounting an earth working tool to a shank having a substantially vertical track on the rear end of the shank, a tool holder having a C-shaped opening at its forward end and adapted to fit over the shank track, and a wedge member adapted for wedging between the shank track and the tool holder to secure the holder to the shank at a selected position with the track forward facing surfaces engaging the flange rear surfaces. The track includes a rearward V-shaped surface and a pair of forward facing surfaces and the holder opening includes a flanges adapted to engage the forward facing surfaces when forced together by the wedge member. Depressions and protrusions are provided on the flanges and forward facing surfaces to secure against vertical movement of the mounted holder relative to the shank. The V-shaped surface has an included angle of substantially ninety degrees. The wedge member includes a striker plate having a first surface which may be struck from the top to secure the holder to the shank track and a second surface which may be struck from the bottom to disengage the holder from the shank track.

3 Claims, 3 Drawing Sheets

TOOL MOUNTING ASSEMBLY

TECHNICAL FIELD

The present invention relates to a tool mounting assembly for the attachment of earth working tools to shanks (or tynes).

BACKGROUND ART

It is a common procedure to mount various types of working tools to the body of a shank.

It is desirable that the vertical heights of the attaching tool be capable of simple adjustment. Such adjustment should be as convenient to operate as possible. It is also desirable to have the mounting system held firmly in place when operating the shank and coupled tool in the ground.

Various types of tools can be attached to shanks and in many cases the attached tools can have considerable span to either side of the shank. Under these conditions, high twisting loads can be applied to the tool mounting assembly.

Often the shank itself may have a minimal width to reduce power requirements and to reduce soil disturbance. It is therefore desirable to minimize the width of tool and mounting systems in conformity with the width of the shank.

A common system for attaching various tools is to form, in the shank itself, a series of holes to which tools can be attached by bolts. The vertical adjustment is time consuming. Further, the formation of such holes generally reduces the strength of the shank.

Serrated tracks are sometimes formed in the rear of the shank to which tools are mounted by clamping two cheek plates to the track. These cheek plates are difficult to keep tight when subject to inevitable asymmetrical side loads.

It is the object of the present invention to overcome and substantially ameliorate the above-described disadvantages and to enhance the usefulness of such systems in the field.

SUMMARY OF THE INVENTION

According to one aspect of the present invention, an assembly for mounting an earth working tool to a shank is provided, having a substantially vertical track on the rear end of the shank, a tool holder having a C-shaped opening at its forward end and adapted to fit over the shank track, and a wedge member adapted for wedging between the shank track and the tool holder to secure the holder to the shank at a selected position with the track forward facing surfaces engaging the flange rear surfaces. The track includes a rearward V-shaped surface and a pair of forward facing surfaces and the holder opening includes a flanges adapted to engage the forward facing surfaces when forced together by the wedge member. Depressions and protrusions are provided on the flanges and forward facing surfaces to secure against vertical movement of the mounted holder relative to the shank.

In another aspect of the present invention, the V-shaped surface has an included angle of substantially ninety degrees.

In still another aspect of the present invention, the wedge member includes a striker plate having a first surface which may be struck from the top to secure the holder to the shank track and a second surface which may be struck from the bottom to disengage the holder from the shank track.

It is an object of the present invention to provide an assembly which will allow for the quick and easy connection of different tools at different heights to a shank, as well as the quick and easy disconnection of such tools from the shank.

It is another object of the present invention to provide an assembly which will provide a secure mounting of the tool which will suitably withstand large side loads which are incurred by the mounted tool.

Still other object, aspects, and advantages of the present invention can be obtained by a study of the drawings, the specification, and the appended claims.

BRIEF DESCRIPTION OF THE DRAWINGS

A preferred embodiment of the invention will now be described with reference to the drawings in which.

DESCRIPTION OF THE PREFERRED EMBODIMENT

Figure 1:
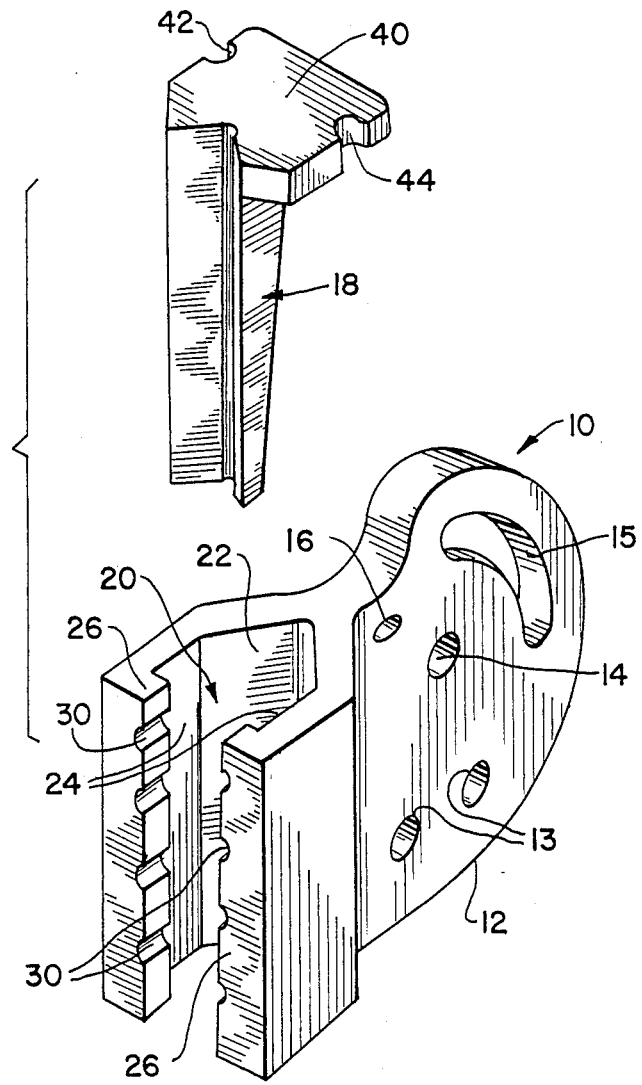
FIG. 1 is a perspective exploded view of the tool holder and wedge of the preferred embodiment.

As shown in FIG. 1, the assembly comprises a holder 10 to which is attached a suitable shaped plate 12 through which holes 13, 14 and slot 15 have been formed. These holes 13, 14 and slot 15 permit the attachment of a wide variety of ground working tools and equipment common in earth moving and agricultural use to the holder 10.

Another hole 16 is formed in the plate 12 through which any suitable tie (not shown) may pass to prevent accidental loss of the wedge 18.

The holder 10 further includes, at its forward end (to the left in FIG. 1), a vertical C-shaped opening or groove 20.

The rearward inside surface 22 of the opening 20 slopes slightly forward from the top to the bottom. A four degree angle from vertical has been found to be a suitable slope for this surface 22. The side surfaces 24 of the opening 20 are substantially vertical and parallel to one another. The flanges 26 at the forward end of the C-shaped opening 20 have an uneven contour such as spaced depressions 30 along their height to provide for secure mounting as will become apparent.

Figure 2:
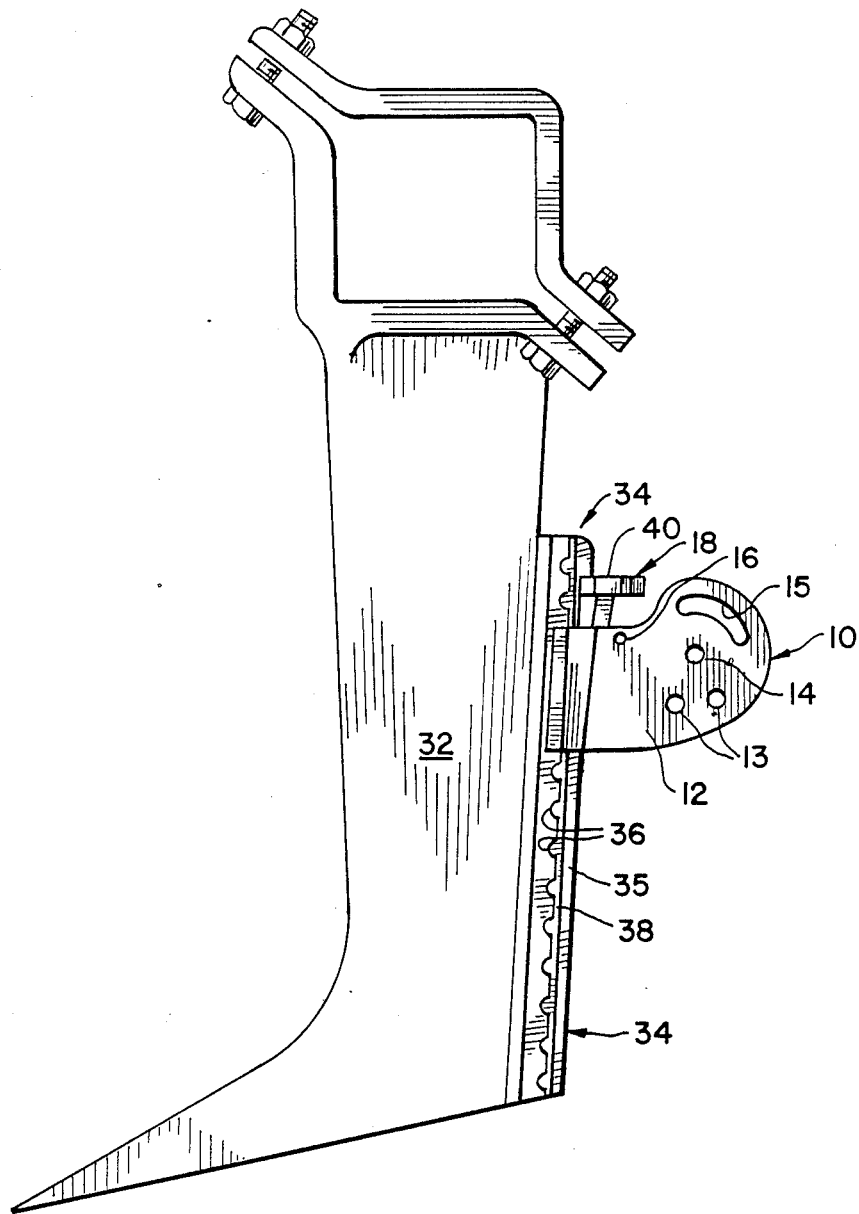
FIG. 2 is a side elevation of a typical ripper shank incorporating a section of suitable track integrally formed as part of the said shank whereon is mounted a tool holder and wedge.
Figure 3:
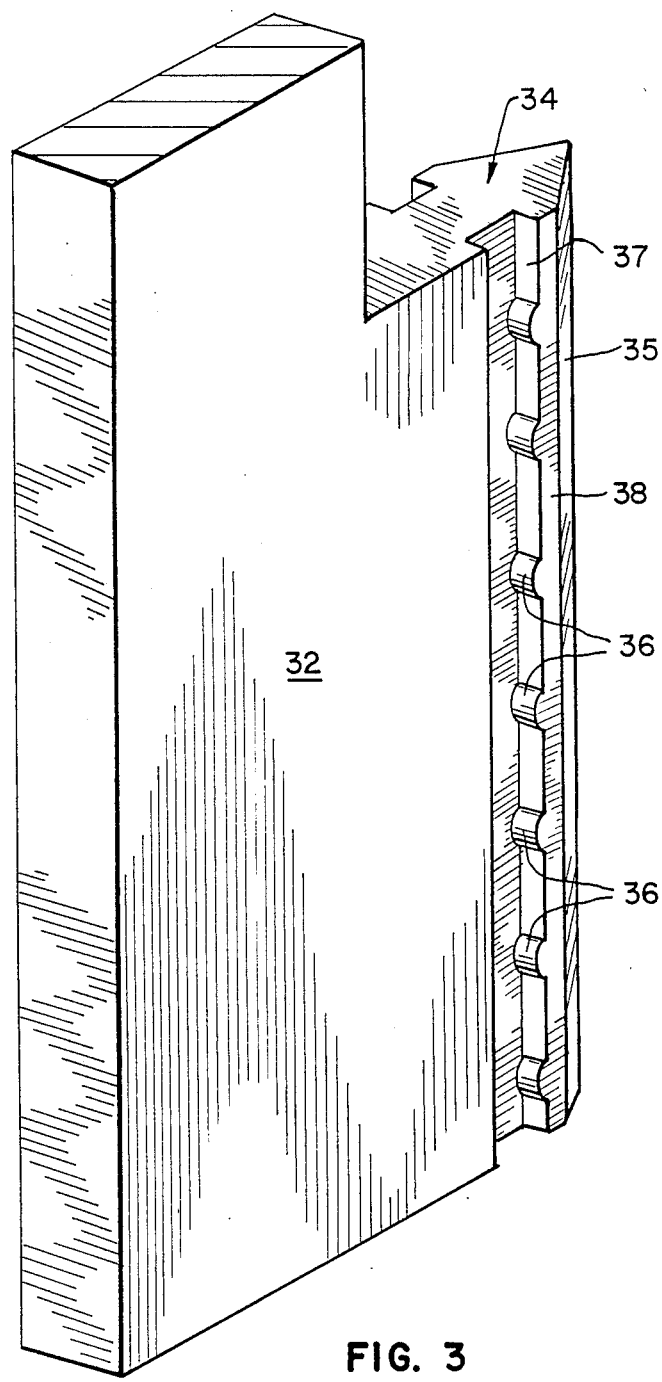
FIG. 3 is a perspective partial view of a portion of the shank.

One shank 32, which may be suitably secured at its upper end to, for example, an earthworking or agricultural device, is shown in FIGS. 2 and 3. The shank 32 includes at its rearward end (to the right in FIGS. 2 and 3) a track 34 substantially in the shape of an arrowhead viewed in plan (best seen in FIG. 3), with the rear surfaces 35 having an included angle of approximately ninety degrees. Although the track 34 as shown is integrally formed with the shank 32, it could also be separately manufactured and then suitably attached to existing shanks.

The forward facing surface portion 37 of the track 34 also has an uneven contour, such as the spaced protrusions 36 shown in FIG. 3, which are adapted to mate with the depressions 30 on the holder 10 as will become apparent.

The side surfaces 38 of the track 34 are formed narrower than the side surfaces 24 of the holder opening 20 to permit full vertical movement of the holder on the track 34. The rear surfaces 35 of the track 34 are formed with substantial clearance to the rear surfaces 22 of the opening 20 so that, when the holder opening 20 is dropped over the track 34, a gap is provided to permit the insertion of the wedge 18.

The wedge 18 (FIG. 1) is preferably formed with a striker plate 40 on its top and has an included angle which is also substantially a right angle to cooperate with the rear surfaces 22, 35 of the holder 10 and shank 32 as will become apparent. The wedge 18 may also be provided with indentations 42, 44 to which any suitable tie through hole 16 may be secured.

The tool holder 10, wedge 18 and track 34 can be made of any suitable material and by any suitable method known to those skilled in the art.

Use of the present invention is thus as follows. The C-shaped opening 20 of the holder 10, which has an attached tool (not shown), is slid over the shank track 34 until the holder 10 is at the desired height for the tool. The flange depressions 30 mate with the track protrusions 36 at a plurality of secured heights for the holder 10.

(While the selected tool could be mounted to a holder after mounting the holder 10 to the shank 32, it should be appreciated that the invention can be most efficiently be used by providing "permanent" holders 10 for each tool such that each tool changing requires only connecting the holder 10 and connected tool to the shank 32. Such "permanent" holders could be provided by integrally manufacturing the holder and the tool.)

The wedge 18 is then inserted between the track rear surfaces 38 and the holder rear surfaces 22 and secured by a hammer plow to the striker plate 40. The assembly is thus accurately located one with another and securely fixed one with another. Further, the cooperating V-shaped portions of the track 34, the holder 10, and the wedge 18 provide excellent load bearing for not only the rearward and forward stresses which are incurred, but also for the large side loads which are incurred by the tools. Various common methods may be used to prevent the accidental disengagement of the wedge 18.

Removal of the holder 10 may similarly be easily accomplished by a hammer blow under the striker plate 40, which will free the wedge 18 which is then removed. The tool holder 10 can then be moved forward slightly to permit the disengagement of the protrusions 36 from the depressions 30, thereby freeing the holder 10 from the shank 32 to allow either complete removal or vertical adjustment of the holder 10.

It will be appreciated that the present invention will allow for the quick and easy connection of different tools at different heights to a shank, as well as the quick and easy disconnection of such tools from the shank.

I claim:

1. An assembly for mounting an earth working tool to a shank having a forward end and a rear end, comprising:
   a substantially vertical track on the rear end of the shank, said track being substantially arrowhead shaped in plan view with
      a rearwardly facing portion including a substantially ninety degree angle, and
      a pair of forward facing surfaces forward of the rearwardly facing portion, said forward facing surfaces including a first mating means;
   a tool holder having a C-shaped opening at its forward end and adapted to fit over the track said opening having
      a rear portion sloped from bottom to top and being defined by a pair of surfaces having an included angle of substantially ninety degrees,
      inwardly extending flanges at each end of the C-shape opening, and
      second mating means on the flanges adapted to engage said first mating means at a selected one of a plurality of heights; and
   a V-shaped wedge member having an included angle of substantially ninety degrees, and said wedge member being adapted for wedging between the track and the tool holder to engage said first mating means with said second mating means to secure said holder to said shank at a selected position.

2. The assembly of claim 1, where the wedge member includes a striker plate having a first surface which may be struck from the top to secure the holder to the track and a second surface which may be struck from the bottom to disengage the holder from the shank track.

3. The assembly of claim 1, wherein the mating means comprise evenly spaced protrusions and depressions.

* * * * *